United States Patent [19]

Hefele

[11] 4,141,313

[45] Feb. 27, 1979

[54] APPARATUS FOR THE PATTERNED DEPOSITION OF POWDERED THERMOPLASTICS ADHESIVE MATERIAL ON THE OUTER SURFACE OF A SURFACE FORM

[75] Inventor: Josef Hefele, Gräfelfing, Fed. Rep. of Germany

[73] Assignee: Kufner Textilwerke KG, Fed. Rep. of Germany

[21] Appl. No.: 706,588

[22] Filed: Jul. 19, 1976

[30] Foreign Application Priority Data

Jul. 23, 1975 [DE] Fed. Rep. of Germany ....... 2532998
Aug. 19, 1975 [DE] Fed. Rep. of Germany ....... 2536911

[51] Int. Cl.² ............................................. B05C 19/00
[52] U.S. Cl. ..................................... 118/212; 118/246; 118/249; 118/261
[58] Field of Search ............... 118/202, 212, 259, 261, 118/249, 246; 101/157, 170

[56] References Cited

U.S. PATENT DOCUMENTS

| | | | |
|---|---|---|---|
| 2,787,244 | 4/1957 | Hickin | 118/212 X |
| 3,110,609 | 11/1963 | Blejzinger | 118/212 X |
| 3,304,861 | 2/1967 | Magid | 101/152 |
| 3,389,655 | 6/1968 | Lorenz et al. | 101/157 |
| 3,641,978 | 2/1972 | Hathorn | 118/412 |
| 3,667,422 | 6/1972 | Saladen | 118/212 X |
| 3,762,365 | 10/1973 | Herzog | 118/212 |

*Primary Examiner*—John McIntosh
*Attorney, Agent, or Firm*—Hill, Gross, Simpson, Van Santen, Steadman, Chiara & Simpson

[57] ABSTRACT

A process and apparatus for the patterned deposition of powdered thermoplastics adhesive material on the outer surface of a textile or other porous-flexible surface form, wherein there is first insertion raked in a pattern of depressions formed in an engraved component an adhesive powder material and then on this powder a further adhesive powder material is insertion raked in the depressions, so that both the powder layers superposed one on the other are taken up by the surface form which is positioned on the engraved component.

12 Claims, 9 Drawing Figures

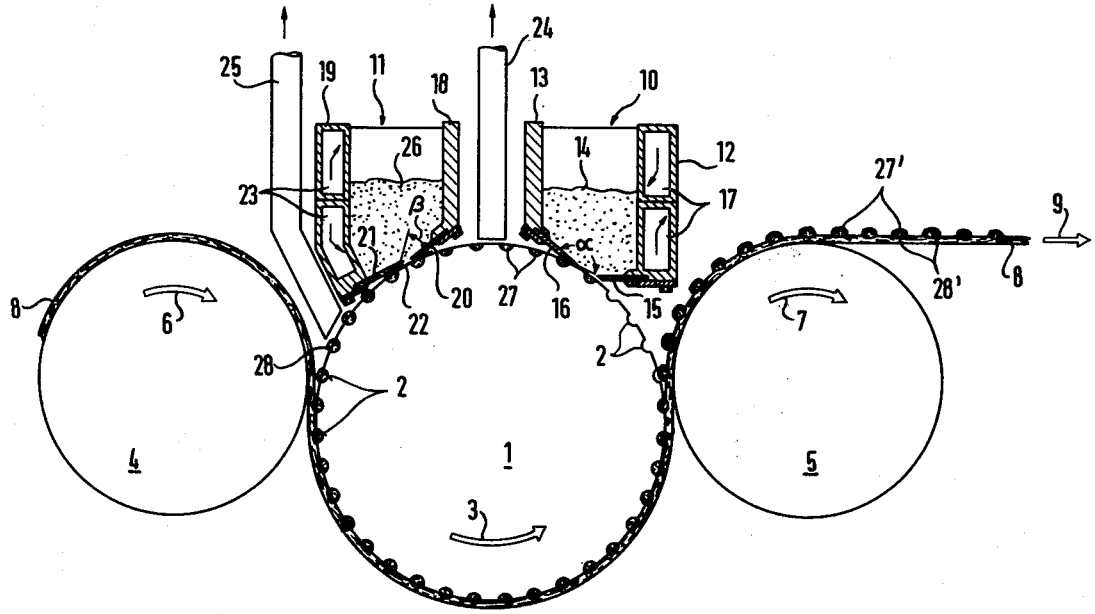

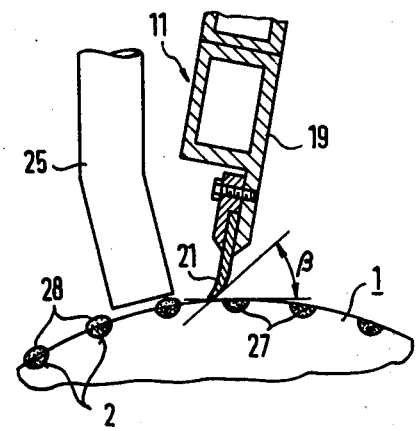
Fig.4
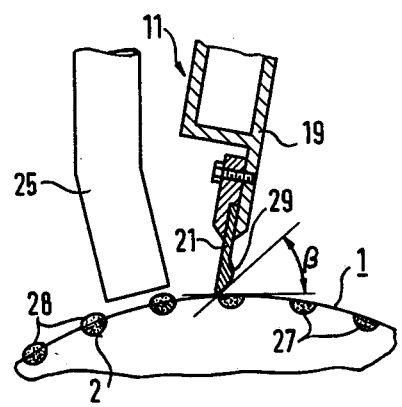
Fig.5
Fig.6
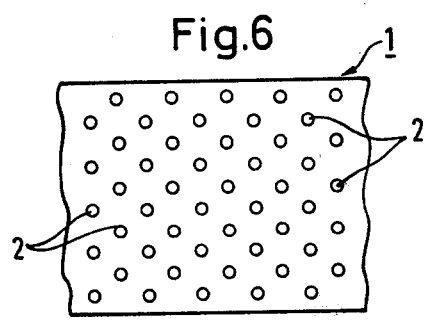
Fig.6a
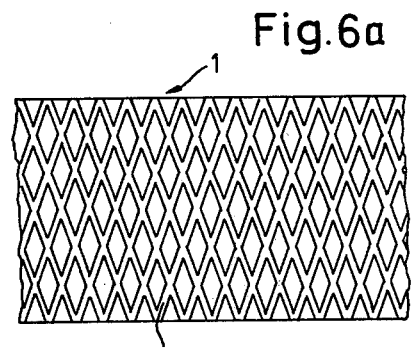
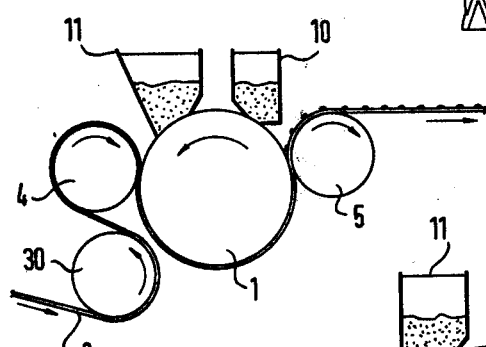
Fig.8
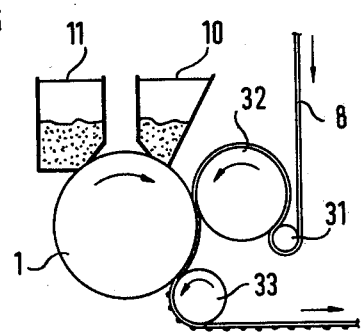
Fig.7

APPARATUS FOR THE PATTERNED DEPOSITION OF POWDERED THERMOPLASTICS ADHESIVE MATERIAL ON THE OUTER SURFACE OF A SURFACE FORM

The present invention relates to an apparatus for the patterned deposition of powdered thermoplastics adhesive material on the outer surface of a textile or other porous-flexible surface form, in particular by means of an engraved component provided with a pattern of depressions arranged in an outer face thereof and in which depressions the adhesive powder is insertion raked, the surface form to be coated being heated and positioned on the outer face of the engraved component and then taken off from it together with the adhesive powder disposed in the depressions. After being taken off the adhesive powder lays lightly clustered in the form of small heaps in a pattern corresponding to the arrangement of the depressions on that side of the surface form to be coated which had been brought into contact with the engraved component. These small heaps of powder can then through further temperature working be sintered together to form a sealed bead.

Such an apparatus functioning in this way is already known (Caratsch, Saladin system). With this process there can, however, only be attained a single patterned thermoplastics sealing adhesive coating.

The present invention in one aspect provides an apparatus for the patterned deposition powdered thermoplastics adhesive material on the outer surface of a surface form, by means of an engraved component provided with a pattern of depressions arranged in an outer face thereof and in which depressions the adhesive powder is insertion raked, the surface form to be coated being heated and positioned on the outer face of the engraved component and then taken off from it together with the adhesive powder in the depressions, wherein there is a first insertion raked in the pattern of depressions in the engraved component an ahesive powder material and then on this powder a further adhesive powder material is insertion raked in the depressions, so that both the powder layers superposed one on the other are taken up by the surface form positioned on the engraved component.

Thus in accordance with the present invention there is first insertion raked in the pattern of depressions an adhesive powder material with specific characteristics and then on this powder there is insertion raked a further adhesive powder material, preferably with characteristics differing from those of the first insertion raked powder, so that both the powder layers superposed the one on the other in the depressions are taken up by the surface form positioned on the engraved component.

The adhesive powders insertion raked in a separate manner one after the other in the depressions in the engraved component may have differing physical or chemical properties. A process in accordance with the present invention is suitable not only for coating with two different sorts of adhesive powder, but serves also for the deposition of two patterned coatings with like physical or chemical properties. The surface material used in the present process may be a material selected from the group consisting of woven textile material, knitted textile material, weft inserted knitted textile material, fleece, non-woven fabric, synthetic foamed material and synthetic leather.

A preferred mode of use is that which relates to the production of so-called affixable stiffening inserts for clothing articles in which, for the affixing of the insert onto the outer face part of the clothing article, there exists an adhesive in the form of a patterned adhesive undercoating with a higher melting viscosity, or higher melting point, and having superposed thereon a patterned upper coating with a lower melting viscosity, or lower melting point. With such inserts there is formed by the fixing of the undercoating which takes place on pressing, due to its higher melting point, or its higher melting viscosity, a barrier for the upper coating so that the latter does not sink into the insert material but binds itself to the outer face material.

An apparatus in accordance with the present invention also enables the carrying out for the first time in a rationalised manner of the production of runs of material which, for example as described in U.S. Pat. No. 3,703,730, have spaced apart stiffening portions through a spaced apart thermoplastics sealing adhesive coating. This can take place through the further adhesive powder being insertion raked in the depressions of one or more regions of the extent of the engraved component encompassing the whole width of the surface form which is to be coated. For such an application there can be utilised thermoplastics sealing adhesive powders of the same physical and chemical properties. However, it is more useful for there to be added to the further adhesive powder which is insertion raked onto the adhesive powder already insertion raked in the depressions of the engraved component a greater quantity of enhanced flow imparting additives, as described in DT-PS 2 012 009 and DT-AS 2 158 282, than that of the powder first insertion raked in the depressions, for example a doubled quantity of such. Should there, however, be superposed onto an undercoating with a lower melting point, or lower melting viscosity, an upper coating with a higher melting point, or higher melting viscosity, it can then, in inverse manner, be required for the powder of the undercoating to have added to it a greater quantity of additives. It is also possible to add to the second adhesive powder insertion raked onto the first powder smaller quantities of other additives, e.g. high dispersive silicic acid, colouring pigments, and carbon black.

An apparatus in accordance with the present invention is further preferably utilisable in the production of netting material made of thermoplastics additives with differing adhesive characteristics on both the sides of the netting. The production of such adhesive netting can be carried out through the use of an engraved component in which the patterned depressions in its outer face are formed by mutually intersecting grooves. Into these depressions there is first dispersed an adhesive powder with a higher melting viscosity and then onto that there is dispersed a further adhesive powder with a lower melting viscosity. These two superposed powder coatings can be drawn off the engraved component by an intermediate carrier formed by a kraft paper, which may be a one-sided siliconised kraft paper, positioned on the engraved component and then become sintered. After cooling, the drawn off adhesive network may be readily stripped off the silicon paper and have direct application through insertion and pressing between two porous-flexible surface forms, e.g. textiles or leather. When cut up it can together with the silicon paper be readily transferred to other surface forms through quick pressing over of the adhesive free side of the intermediate carrier. Thus the adhesive coating with the higher melting viscosity becomes directly superposed on the surface form. In this way the adhesive coating with the lower melting viscosity, which lay under the silicon paper, is then placed over the coating with the higher melting viscosity. The latter forms on later pressing with an overlying material, or for example by pressing on of a surrounding edge band, the previously mentioned barrier for the overlying coating. In this way there can be achieved high adhesion strength even with light machine pressing. The adhesive netting produced by this process can also with advantage be used as rearside adhesive coatings for gold lace.

Prior to the conception of the present invention it was not to be expected by a person skilled in the art that after filling the depressions of the engraved component with the first adhesive powder by a first rake that yet another substantial quantity of a further adhesive powder could be superposed in a sufficiently localised manner on the pattern of fillings already deposited and without at the same time the adhesive powder reaching engraved component surfaces lying between the depressions. In an unexpected manner it is possible after the first filling of the depressions to add again about the same quantity of a further adhesive powder with exact localisation with respect to the already inserted first adhesive powder, and without the powder remaining on the engraved component surfaces between the depressions. There is also unexpectedly found to be also no admixing of the two powders inserted one after the other into the engraved component into an indeterminate form of mix.

The invention in another aspect provides apparatus for the patterned deposition of powdered thermoplastics adhesive material on the outer surface of a surface form, comprising an engraved component having an outer surface provided with a pattern of depressions therein, on which engraved component the surface form to be coated can be positioned, and an adhesive presenting rake and powder supply means overlying the said outer surface, the engraved component with the positioned surface form being movable relative to the rake perpendicularly to its presented edge, wherein the said adhesive presenting rake and powder supply means includes two presenting rakes with separate powder supplies arranged behind one another in the direction of the engraved component movement and wherein the setting angle extending from the outer surface of the engraved component on the side of the powder supply up to the outer surface connected to the presented rake edge for the prior disposed rake is greater than the similar angle of the rake which follows in the direction of movement.

Thus there is provided a particularly suitable apparatus for carrying out the process according to the invention. This apparatus includes an engraved component with a pattern of depressions in an outer face thereof, on which the surface form to be coated can be disposed, and overlying this face there is an adhesive presenting rake and powder supply means whereby the engraved component, with the surface form disposed on it, is movable relative to the rake perpendicular to its raking edge. This arrangement is characterised in that two presenting rakes with separate powder supplies are arranged following one another in the direction of movement, and in that the setting angle which extends from the outer surface of the engraved component between its depressions on the side of the powder supply up to the outer surface connected to the presented rake edge for the prior disposed rake is greater than the similar angle of the following rake.

This differentiation in the setting angles enhances the prevention of intermixing of the superposed insertion raked adhesive powders. The amount of adhesive powder which by means of the following second rake becomes superposed onto the powder fillings already placed in the depressions of the engraved component means of the first rake is the greater the more sharply inclined the setting angle of the rake is to the face of the engraved component. A particularly suitable setting angle between the outer surface connected to the presented edge of the prior disposed rake to the outer surface of the engraved component on the side of the powder supply is at least 90 degrees and at most 180 degrees, preferably between 120 degrees and 170 degrees. The similar angle in respect of the following rake in the direction of movement of the engraved component is at most 90 degrees, preferably between 30 degrees and 70 degrees.

In a preferred mode of construction each powder supply is provided with its own respective powder container which has an outlet aperture for the adhesive powder disposed prior to its presenting rake. At least one of the side walls of one or both of the powder containers can be water cooled. Behind either one or both of the presenting rakes there may be disposed a suction ventilator column arranged for taking off excess spread adhesive powder and which can be moved transverse to the direction of movement of the engraved component.

The engraved component is preferably in the form of a rotatable roller which has on its outer surface a pattern of depressions for receiving the adhesive powders which are deposited on the surface form, and both the rakes with separate adhesive powder supplies are disposed stationary around the circumference of the engraved component.

For coating with the process and apparatus in accordance with the present invention suitable adhesive powders may be constituted from for example copolyamides, polyurethanes, polyesters and low and high pressure polyethylenes. The particle size of the utilisable powder fraction usually lie in the range between about 60 and 250 my. In particular cases smaller granulation fractions may also be selected for use.

The invention will be further described, by way of example only, with reference to the accompanying drawings, in which:

FIG. 4 is a cross-section of another second rake for use in the embodiments of FIGS. 1 and 2;

FIG. 5 is a cross-section of a third contructional form of the second rake;

FIG. 6 shows in developed form a part of the upper surface of the engraved roller of the FIG. 1 embodiment;

FIG. 6a shows in developed form a part of the upper surface of the engraved roller of the FIG. 1 embodiment with other, namely linear, depressions;

FIG. 7 shows on a reduced scale a third embodiment of the apparatus according to the invention; and FIG. 8 is a view similar to FIG. 7 of a fourth embodiment of the apparatus according to the invention.

Figure 1:
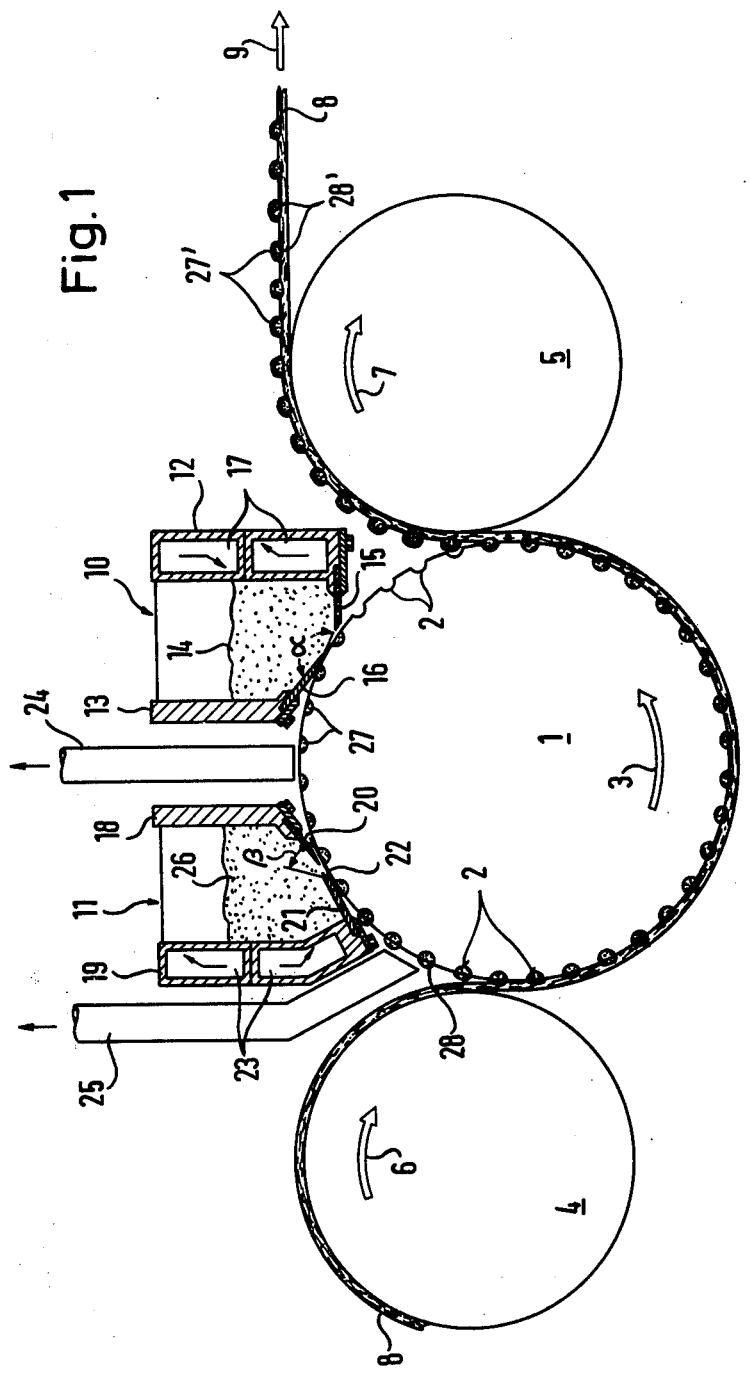
FIG. 1 is a cross-section through a first embodiment of an apparatus according to the invention for the patterned deposition of powdered thermoplastics adhesive material.

The apparatus shown in FIG. 1 has as the engraved component an engraved roller 1 which is rotatable in the direction of the arrow 3 and which has circumferential cup-like depressions 2 arranged in a uniformly distributed pattern. The pattern in which the depressions 2 are arranged in the outer surface of the engraved roller 1 is shown in FIG. 6.

On either side of the engraved roller there are arranged feed and take-off rollers 4 and 5 which are respectively rotatable in the directions of the arrows 6 and 7 and of which at least the feed roller 4 is heated. A surface form 8 which is to be coated, which may be for example a run of woven material, is fed onto the feed roller 4 and by rotation of the feed roller 4 to the engraved roller 1. When disposed on the roller 4 the surface form 8 runs around about one half of its extent and subsequently passes in the direction of the arrow 9 onto the outer surface of the take-off roller 5 to be drawn out from the apparatus.

Above the engraved roller 1 there are disposed two powder containers 10, 11 arranged one after the other in the direction of rotation of the engraved roller. The side walls 12, 13 of the powder container 10 which is prior disposed in the direction of rotation extend parallel to the rotational axis of the engraved roller and have blades 15, 16 mounted at their lower ends. These latter form between them a feed supply hopper for powder 14 present in the container 10 to the outer surface of the engraved roller 1. While the blade 15 which is prior disposed in the direction of rotation has a small spacing between it and the outer surface of the engraved roller, or makes light contact with the outer surface of the engraved roller, the following blade 16 which is secured to the sidewall 13 of the powder container 10 through deflection of it, lies with its end firmly against the outer surface of the engraved roller. The blade 16 forms thereby a first presenting rake for the quantities of powder introduced through the feed supply hopper into the depressions 2 of the engraved roller 1. The rake edge lying on the outer surface of the engraved roller 1 is sharpened to a point.

The blade 16 with its raking edge lies on the outer surface of the engraved roller 1 is inclined towards the roller surface lying below its own bearing location. This is arranged such that the setting angle α which extends between the raking edge of the blade 16 and the tangent to that part of the roller lying under the raking edge is about 140 degrees. The setting angle may, however, be other than this value but is usually between 120 degrees and 170 degrees.

Since the take-off roller 5 is usually heated, the side wall 12 of the powder container 10 which lies adjacent the roller 5 is provided with a water cooling arrangement 17. In this way heat radiating from the roller 5 is kept away from the inside of the powder container 10.

The powder container 11 which follows in the direction of rotation of the engraved roller 1 has at the lower edges of its two side walls, 18, 19 both of which extend parallel to the rotational axis of the roller 1, two blades 20 and 21 respectively which form between them a powder hopper and which are inclined to each other. The blade 20 is slightly spaced from the outer surface of the roller or sits lightly upon it while the blade 21 which serves as a presenting rake has its edge which is remote from the clamped part of the blade, through slight flexure of it, lying on the outer surface of the roller. This second blade 21 lies with its lower width extent tangential to the roller outer surface. The small sloping surface 22 which from this width extent of the blade joins onto the overlying presented rake edge, forms with the roller tangent under the raking edge against the roller surface a setting angle β. This angle is usually between 20 degrees and 85 degrees, preferably between 30 degrees and 60 degrees and is about 45 degrees in the illustrated embodiment.

The side wall 19 of the container 11 directed towards the feed roller 4 is, in the same manner as the side wall 12 of the container 10, provided with a water cooling arrangement 23. Both the blades 16, 21 are for practicability made of sheet steel.

Behind the powder containers 10, 11 in the direction of movement of the engraved roller there are at least two ventilator columns 24 and 25 which are close to one another along the axial disposition of the engraved roller 1. The columns 24, 25 are moreover displaceable parallel to the rotating axis of the engraved roller. These ventilator columns can also be brought to a disposition extending outside of that of the surface form 8 to be coated so that they can extract quantities of powder from depressions 2 in the engraved roller 1 which lie beyond the sides of the surface form.

Upon rotation of the rollers 1, 2 and 3 in the direction of the arrows the adhesive powders in the powder containers 10, 11, which are of like or differing chemical or physical characteristics, are deposited through the container apertures between the pairs of blades 15, 16 and 20, 21 on the outer surface of the engraved roller 1. In this way the depressions 2 are first filled with the adhesive powder 14 from the container 10 and the outer surface parts of the engraved roller lying between these depressions are swept free of powder by means of the blade 16. Subsequently the depressions 2 with their powder filling 27 pass under the outlet aperture between the blades 20, 21 of the powder container 11. Here through the assistance of the presenting edge of the rake 21 there is superposed on each powder filling a specific quantity 28 of powder 26 which has been placed in the container 11. The powder quantities 28 will after passage past the presenting edge of the blade eventually to some extent project beyond the roller outer surface.

Upon further rotation of the engraved roller, the powder coatings 27, 28 inserted in the depressions 2 become pressed onto the surface form 8 when one latter reaches the roller outer surface. In the course of further rotation of the engraved roller the powder coatings 27, 28 then become adhered to this surface form. Then upon lifting the surface form off from the engraved roller 1 through the take-off roller 5 the powder coatings 27, 28 become drawn out of the depressions 2. The powder quantities 28 then become a patterned undercoating formed directly on that outer surface of the surface form 8 which came up against the engraved roller 1. The powder fillings 27 disposed in the depressions 2 meanwhile become superposed as an upper coating 27' in the form of small heaps exactly superposed on the adhesive clusters 28'.

As previously mentioned it is possible to arrange that the surface form 8 has in one or more extents of its width a two layered adhesive coating and in one or more other extents of its width only a single layered adhesive coating. For this purpose the powder container 11, prior to the second blade 21 in an extent of it, in the direction of rotation of the engraved roller, can be divided off through inserted separating walls. In this way the powder container 11 can be filled with powder 26 only in those parts of it which lie over the extents of the surface form which are to have a two layered coating. It is, however, also possible for the powder container 11 itself to only extend over the respective required width extent of the surface form 8 which is to be coated.

Figure 2:
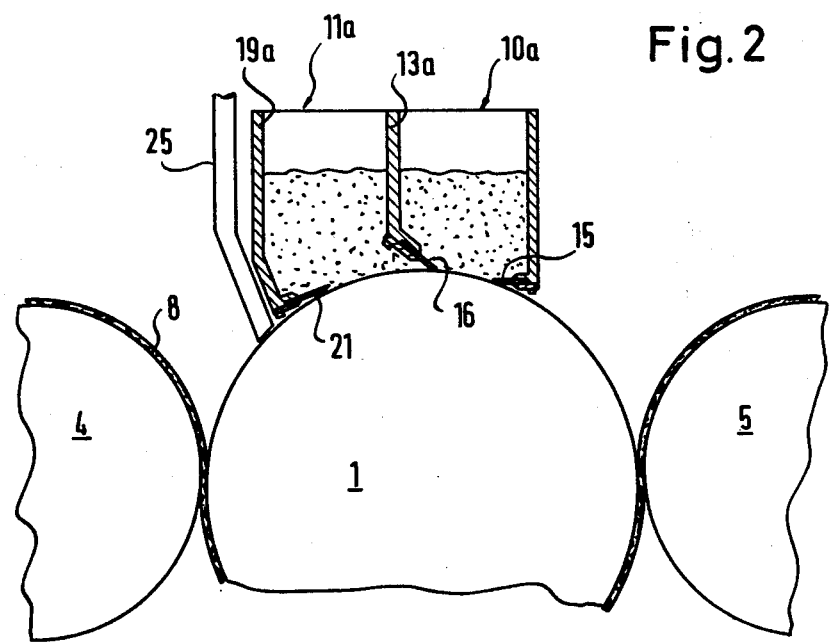
FIG. 2 is a cross-section showing on a reduced scale a simplified further embodiment of an apparatus according to the invention.

In the simplified embodiment shown in FIG. 2 the containers 10 and 11 of the embodiment shown in FIG. 1 are assembled together as a single powder container. By means of a separating wall 13a the powder container is divided into two chambers 10a, 11a for the two different adhesive powders 14, 26. At the lower end of the separating wall 13a directed towards the engraved roller 1 there is disposed the first blade 16. At the lower end of the outer wall of the chamber 11a there is disposed the second blade 21. In this case the suction exhaust ventilator 24 between the container chambers 10a and 11a is omitted.

Figure 3:
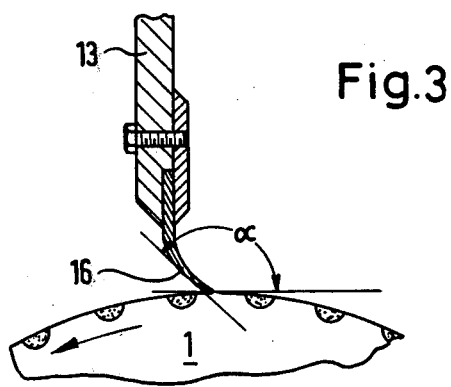
FIG. 3 is a cross-section of another first rake for use in the embodiments of FIGS. 1 and 2.

In the embodiments shown in both FIGS. 1 and 2 the blade 16 for precision wiping off of the powder 14 can for this purpose be given a more or less strongly impressed flexure against the engraved roller 1. FIG. 3 shows a particularly strong flexure of the blade 16.

The second blade 21 following in the direction of rotation of the engraved roller 1 may have the construction and arrangement shown in FIG. 4. In this construction the blade 21 is disposed almost perpendicularly to the roller outer surface but has a rearwardly curved presenting edge. This edge may also carry a superposed collar 29 (FIG. 5), which can consist of metal or of plastics. The imparted flexure in or the collar strengthening of the blade edge leads to an increase in the quantity of adhesive powder which is spread with this blade. In the embodiments shown in FIGS. 4 and 5 the blade 21 has at its contact point effectively an angular setting $\beta$ of between 60 degrees and 85 degrees to the tangent to the roller surface underlying the blade.

The embodiment shown in FIG. 7 differs from that shown in FIG. 1 only in that prior to the feed roller 4 there is a still further insertion roller 30 for the surface form 8 which is to be coated. As with the embodiment shown in FIG. 1 the produced coating 27', 28' lies on the upper side of the drawn-off surface form.

In contradiction to this, the coating obtained by means of the embodiment shown in FIG. 8 lies on the underside of the drawn-off surface form. The surface form 8 is, prior to its coating, fed to the engraved roller 1 over an insert roller 31 and a lead-in roller 32. In this case it is positioned on the outer surface of the engraved roller over only a short stretch and is then drawn off the engraved roller 1 by a take-off roller 33.

In FIG. 6a there is illustrated the outer surface of an engraved roller which shows mutually intersecting grooved depressions for the production of an adhesive network.

The invention will be further described with reference to the following illustrative Examples.

EXAMPLE 1

Coating of a fabric surface form for an ironed insert on fur or leather with differing melting points and differing melting viscosities of the two coatings.
Technical Data:
Engraved roller: Depressions in 11-mesh-point pattern.

First blade: Sheet steel rake, gauge 0.3 mm, ground, setting angle from contact zone to roller outer surface 135 degrees, pressed onto the engraved roller with flexure.
Second blade: Sheet steel rake, gauge 0.3 mm, edge bevelled off to 45 degrees, lying tangentially on the engraved roller.
First powder: Copolyamide powder, plasticiser content, 60–250my, 0.25 percent magnesium stearate content, optical brightener.
  Melting point, about 66 degrees C.
  Melting viscosity, 70 degrees C.: 35000 Poise
  Melting viscosity, 80 degrees C.: 9000 Poise
  Melting viscosity, 90 degrees C.: 3500 Poise
Second powder: Copolyamide powder, free of plasticiser, 60–200my, 0.15 percent magnesium stearate, no optical brightener.
  Melting point, about 92.5 degrees C.
  Melting viscosity, 95 degrees C.: 56000 Poise
  Melting viscosity, 100 degrees C.: 28000 Poise
  Melting viscosity, 110 degrees C.: 9000 Poise
Melting viscosity, 120 degrees C.: 4200 Poise
Engraved roller temperature: 35 degrees C.
Temperature of heating roller 4: 220 degrees C.
Temperature of heating roller 5: without second blade, 80 degrees C. with second blade, 120 degrees C.
Running speed: about 10m per min
Coating weight: without second blade: 20g per square m, (single coating)
  with second blade: 28g per square m, (double coating)

The double coated insert can be affixed to furs and leather without any tendency for it to strip off by subjecting the adhesive material points to a temperature of about 75 to 90 degrees C. The adhesion so attainable is up to three times higher than that with a single coating.

With a second rake as shown in FIG. 4 the following coating weights are obtained for the lower coating and upper coating in accordance with the respective setting angles. The below weights refer to coating weights upon the engraved roller:

| Angle of Second Rake | Lower Coating | Upper Coating | Together |
| --- | --- | --- | --- |
| 80 degrees | 20g/square m. | 7g/square m. | 27g/square m. |
| 70 degrees | 20g/square m. | 14g/square m. | 34g/square m. |
| 60 degrees | 20g/square m. | 22g/square m. | 42g/square m. |

The insert can also be affixed to the upper material of textile clothing pieces with a hand iron through simple pressing. The thus attained adhesion effect corresponds to that of affixing previously by a pressing machine.

EXAMPLE 2.

Adhesive net coating of a silicon paper intermediate carrier with differing melting points and differing melting viscosities of the two coatings.
Technical data:
Engraved roller: mutually intersecting grooved depressions in the net pattern as shown in FIG. 6a.
First blade: see Example 1
Second blade: see Example 1
First powder: Melting point, about 116 degrees C.
  Melting viscosity, 120 degrees C.: 140000 Poise.
  Melting viscosity, 130 degrees C.: 42000 Poise.
  Melting viscosity, 140 degrees C.: 18000 Poise.

Second powder: identical with the first powder of example 1.
Engraved roller temperature: 35 degrees C. Temperature for
Heating roller 4: 220 degrees C.
Heating roller 5: 80 degrees C.
Weak infra-red irradiation after coating process.
Running speed: about 8m/min.
Total applied weight: about 30g/square m.

The silicon paper is fed between the engraved roller and a tautly stressed auxiliary textile fabric which also winds around the engraved roller.

The adhesive net positioned on the silicon paper can be utilised for the hemming of the borders of articles of clothing. Through a short overpressing on the non-coated side of the silicon paper the band form cut up adhesive net becomes transferred to the hem.

After stripping off of the silicon paper the laid-on hem border, which has had light pressure exerted on it by hand, has sufficient adhesion to the transferred adhesive net to withstand further working stages of ready-made clothing processing. With final hot transfer pressing the eventual adhesive connection is produced. The adhesive connection is fast to chemical cleaning and is washable at a washing temperature of 30 degrees C.

I claim:

1. Apparatus for the patterned deposition of two adhesive powders of different melting behavior in superimposed layers of substantially equal thickness on an outer-engraved surface, comprising an engraved roller having the outer-engraved surface provided with a pattern of depressions therein for receiving the adhesive powders as the engraved roller is coated and as said engraved roller is moved in a path of movement, adhesive powder supply means having circumferentially spaced first and second places of supply for coating the engraved roller at circumferentially spaced powder supply intervals with the powders having different melting characteristics, the engraved roller and its outer-engraved surface being movable relative to said supply means for receiving first one type of adhesive powder and then the other type of adhesive powder after being raked, and a first make downstream of the first place of supply and a second rake downstream of the second place of supply and said rakes both being in the path of movement of said engraved roller and associated with said supply means and said engraved roller and with the first rake having a setting angle extending from the outer-engraved surface of the engraved roller which is greater than a similar angle of the second rake and for raking said outer-engraved surface following deposition of the first powder onto the outer-engraved surface from the powder supply means, the setting angle of each of the rakes being measured on the powder supply side of each of the rakes between (a) a tangent to that part of the engraved roller lying under a raking edge of the associated rake and (b) an outer surface of the rake on its powder supply side of the rake, the second rake being operatively associated for raking the outer-engraved surface following deposition of the second powder from the powder supply means onto the outer-engraved surface and into the pattern of depressions, the second rake having a setting angle of the tangent to the outer surface of the rake on its powder supply side on the point, where the rake touches the roller of at most 90 degrees.

2. Apparatus according to claim 1 wherein the first rake setting angle is between 120 degrees and 180 degrees and the said similar angle is between 20 degrees and 85 degrees.

3. Apparatus according to claim 2 wherein the said similar angle is between 30 degrees and 60 degrees.

4. Apparatus according to claim 1 wherein the rake which follows in the direction of movement of the engraving component has its presented edge directed in the opposite direction to that of the direction of movement of the engraving component with its width lying substantially tangential to the engraving component.

5. Apparatus according to claim 1 wherein the rake which follows in the direction of movement of the engraving component has its presented edge bent back in the direction of movement of the surface form being treated.

6. Apparatus according to claim 1 wherein the rake which follows in the direction of movement of the engraving component has in the region of its presented edge a collar forming a thickening.

7. Apparatus according to claim 1 wherein at least one of the said rakes has its presented edge bearing on the engraving component through light flexure of the rake.

8. Apparatus according to claim 1 wherein each powder supply comprises a respective powder container and has an outlet aperture for the adhesive powder prior to its respective presenting rake.

9. Apparatus according to claim 1 wherein water cooling means is provided for cooling at least one of the side walls of at least one of the powder containers.

10. Apparatus according to claim 1 wherein following at least one of the presenting rakes is a suction column positioned for taking off of excess insertion raked adhesive powder.

11. Apparatus according to claim 1 wherein the engraving component is a rotatable roller which has on its outer surface a pattern of depressions for receiving adhesive powder deposited on the surface form being treated and wherein both the rakes with separate adhesive powder supplies are positioned stationarily at the perimeter of the said roller.

12. Apparatus according to claim 1 wherein the pattern of depressions in the outer surface of the engraving component are formed from mutually intersecting grooves for the fabrication of a thermoplastics adhesive netting.

* * * * *